United States Patent Office 2,838,820
Patented June 17, 1958

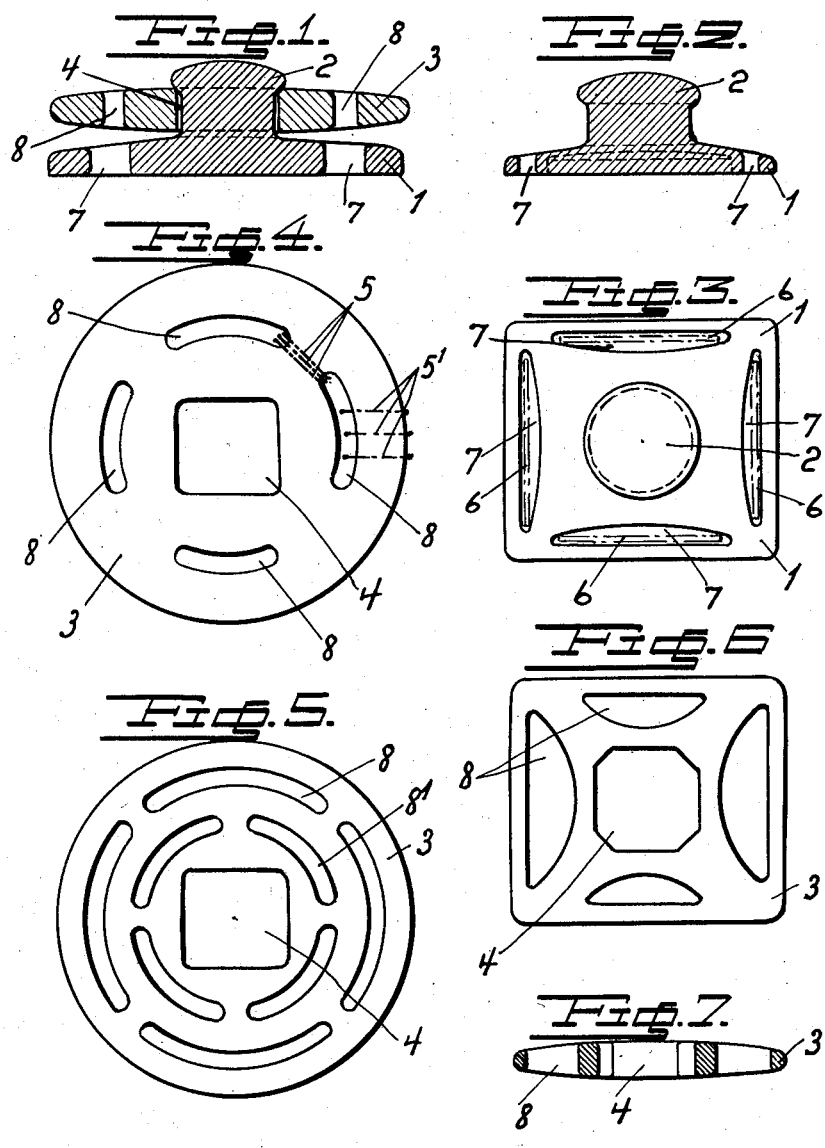

2,838,820

PRESS-BUTTON OF PLASTIC OR LIKE MATERIAL

Hans Eric Wilhelm Håkanson, Stockholm, Sweden, assignor to Gusums Bruks Aktiebolag, Gusum, Sweden Application September 1, 1954, Serial No. 453,460

Claims priority, application Sweden February 4, 1954

1 Claim. (Cl. 24—216)

This invention refers to a press-button of plastic or similar material, comprising a stud part having a protruding stud and a socket part having a central hole receiving the stud when the press-button parts are temporarily united. The respective parts of the button are intended to be fastened to the material of two parts of clothes, gloves, collars or the like for temporarily securing such overlapping pieces of material to one another.

The object of the invention is to provide an easily manufactured stud part and corresponding suitable arrangements in a second socket part, said stud part according to the invention being made as an integral unit. There are known already for similar purposes split button-portions, the manufacture of which necessitates the use of special means for the splitting with consequential higher manufacturing costs. The press-button according to the invention has advantages over prior press-buttons also in other respects.

The annexed drawing shows some embodiments of the invention.

Fig. 1 is a cross section of the press-button in locking position with a stamping pad-like part and a socket part.

Fig. 2 shows, on a smaller scale, a socket part reinforced with glass fibre or the like.

Fig. 3 is a top plan view of a socket part, square in shape and provided with slots inside its straight edges.

Fig. 4 shows in top plan view another embodiment of the socket part with a square button portion and circular outer edge, provided with spaced slots along a circle inside the edge.

Fig. 5 shows in top plan view, a socket part resembling that illustrated in Fig. 4, but with two series of slots disposed one inside the other.

Fig. 6 shows, also in top plan view, a socket part of generally square shape, and having a multangular central opening, and having larger slots than shown in Fig. 3, and Fig. 7 is a cross section of the same.

Referring now to the figures, the numerals 1 and 3 designate a press-button comprising a stamping pad-like part 1 having an integral protruding stud 2 and a socket part 3 with a central hole 4 receiving the stud 2 when the press-button parts 1, 3 are temporarily united. The stud 2 is formed integrally with its base, and said base is provided with mutually spaced slots 7 located inside the periphery of the base part 1 to serve as suitable means for fastening the part by means of sewing-threads 5, 5' or bands 6 in combination with arbitrary fastening means. The socket part 3 has, around its central hole 4, similar slots 8 which, besides serving for fastening this part to a piece of material, provide for the necessary resilient yielding of the die part body when the stud 2 is being inserted in and through the hole 4. According to the invention the meeting surfaces of the two parts 1, 3 are convex so as approximately to abut each other at the central portions of said parts 1, 3 in order to prevent the sewing-threads 5, 5' or fastening bands 6 in the slots 7, 8, 8' from reducing the efficiency of the co-operation between the button portion and the central hole 4 when the press-button 1, 3 is in mounted, operative position and also in order to reduce the wear on the sewing-threads or fastening bands during use. In the embodiments shown the stud 2 is formed as a round body in section or with a two-cornered or polygonal cross section and is provided with a free extension in the form of a flange, the central portion of the stud part 3 being shaped to correspond thereto. Series of slots 8, 8' may be arranged one inside the other, as shown in Fig. 5, in the socket part 1 to increase the yielding of the part 3 when the stud 2 is being inserted through the central hole 4, and the limiting contours of these slot series may be of any desired kind. It is preferred to reinforce the press-button parts 1, 3 or at least one of them by means of glass fibres or the like placed in their material.

Of course the details described above may be modified without abandonment of the inventional spirit.

I claim:

A press-stud fastener of molded material comprising a stud part including a base and an outwardly directed stud, having a bulging outer end portion, a socket part having a central hole slightly smaller than said bulging end adapted to receive said stud by resilient axial flexing of the portions of said socket part adjacent said hole, so as to lock said parts to one another, the edges of said socket part surrounding said central hole being unbroken, said stud part being formed as a single piece and having a plurality of openings extending through the base thereof which provide means whereby said stud part may be secured in position to an article having two parts to be joined in overlapping relationship, said socket part being formed with a plurality of angularly extending slots adjacent said central hole, which slots, besides serving as a means whereby said socket part may be secured in position on a part to be joined, also impart to the edge portions of said socket adjacent said hole a degree of radial resiliency such as will allow for pressing of the stud on said stud part through the central hole in said socket part by yielding of the side portions of said socket part by yielding of the side portions of said socket adjacent said hole in the radial direction, the opposed surfaces of said two parts being convex so as substantially to abut each other at the central portions of said parts, thereby preventing securing means passing through said slots from interfering with the efficiency of the cooperation between the stud on the stud part and said portions of said socket part adjacent said central hole when said parts are united and also reducing the wear on the securing means during use.

References Cited in the file of this patent

UNITED STATES PATENTS

| | | |
|---|---|---|
| 2,070,162 | Friedrich | Feb. 9, 1937 |
| 2,311,613 | Slayter | Feb. 16, 1943 |
| 2,368,100 | Boenecke | Jan. 30, 1945 |
| 2,656,578 | Tworek | Oct. 27, 1953 |

FOREIGN PATENTS

| | | |
|---|---|---|
| 20,285 | Austria | June 10, 1905 |
| 22,848 | Britain | Nov. 7, 1905 |
| 58,646 | Austria | Apr. 10, 1913 |
| 75,872 | Switzerland | Oct. 1, 1917 |
| 621,404 | Britain | Apr. 8, 1949 |